C. G. SMITH.
SPRING WHEEL.
APPLICATION FILED DEC. 14, 1915.

1,226,397.

Patented May 15, 1917.
3 SHEETS—SHEET 1.

Witness
Otto E. Hoddick.

Inventor
C. G. Smith.
By A. J. O'Brien
Attorney

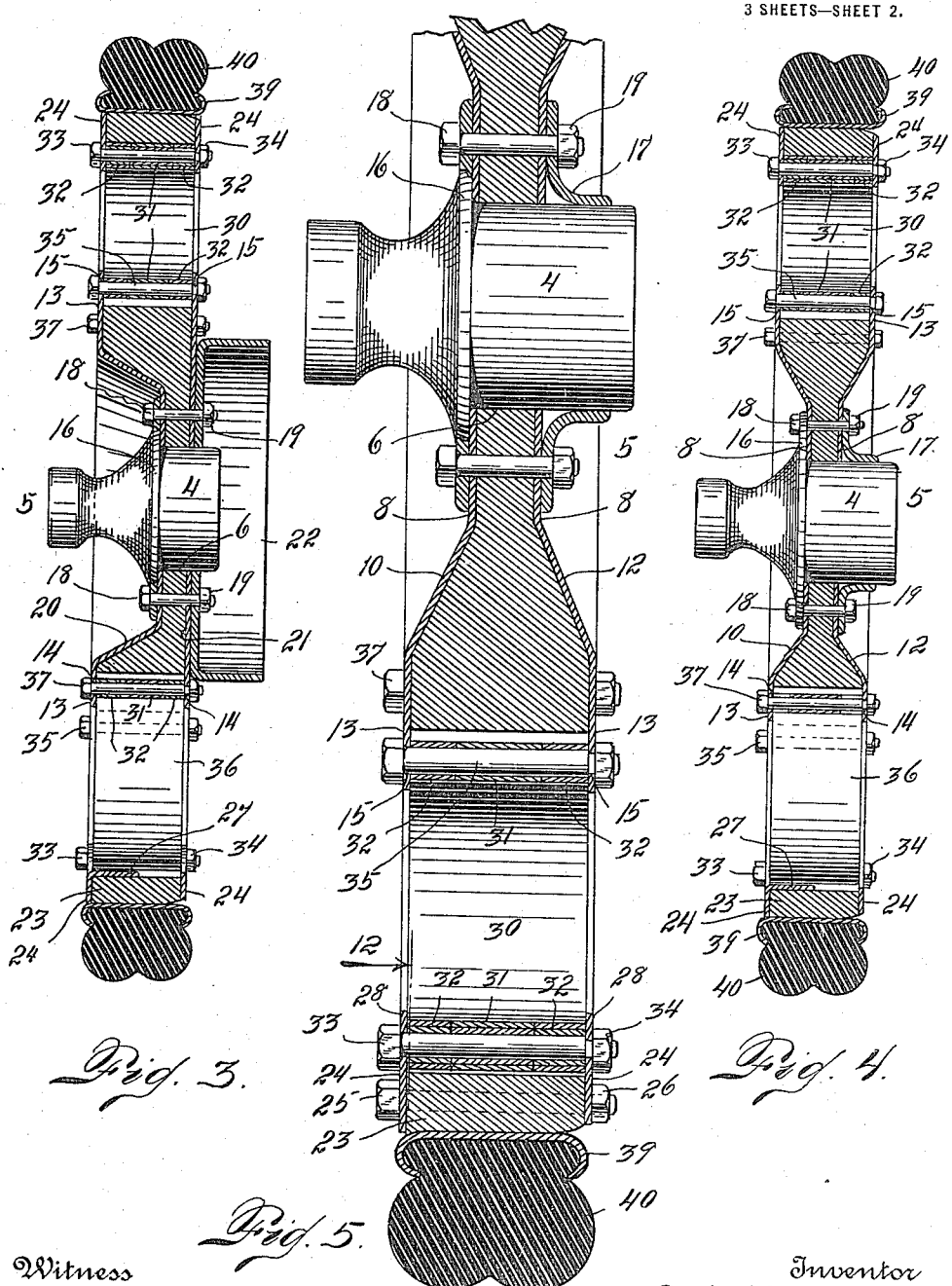

C. G. SMITH.
SPRING WHEEL.
APPLICATION FILED DEC. 14, 1915.
1,226,397.
Patented May 15, 1917.
3 SHEETS—SHEET 3.
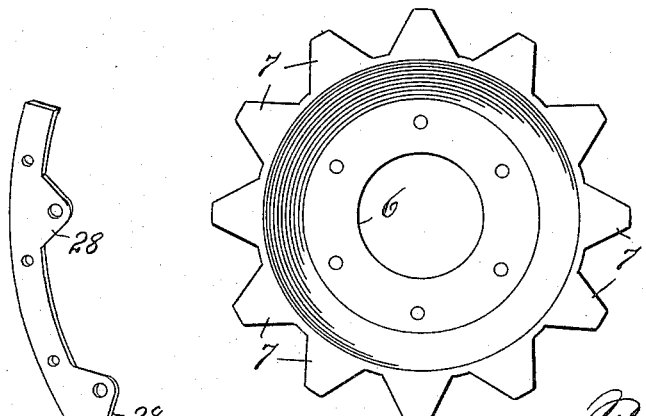
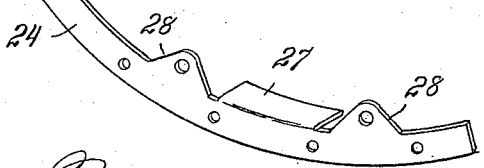
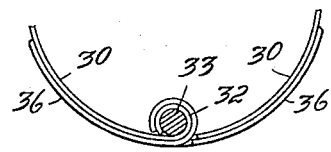
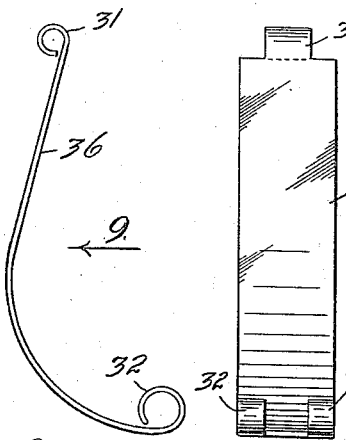
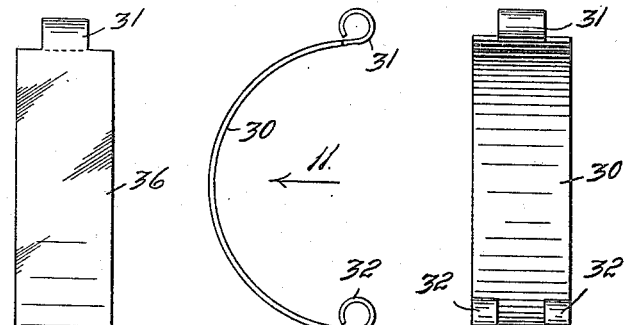

UNITED STATES PATENT OFFICE.

CICERO G. SMITH, OF PALISADES, COLORADO.

SPRING-WHEEL.

1,226,397.

Specification of Letters Patent.

Patented May 15, 1917.

Application filed December 14, 1915. Serial No. 66,713.

*To all whom it may concern:*

Be it known that I, CICERO G. SMITH, a citizen of the United States, residing at Palisades, county of Mesa, and State of Colorado, have invented certain new and useful Improvements in Spring-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring wheels, my object being to provide a wheel of this character which will have sufficient resiliency or yielding capacity to avoid the necessity of mounting inflated tires upon wheels of vehicles, more particularly of the automobile class.

One of the essential features of my invention is to have circular springs located between the hub and rim of the wheel, and to further connect the said hub and rim by spoke springs which are in engagement with the circular springs and coöperate therewith to produce the aforesaid function, the inner extremities of the spoke springs and the members comprising the circular springs being hingedly connected with bolts passed through plates secured to the opposite sides of the hub, and their outer extremities hingedly connected with bolts passed through plates secured to the opposite sides of the rim.

Another feature of my invention is to provide the rim plates with flanges which project laterally and are adapted to engage the under surface of the felly of the wheel.

Having briefly outlined my improved construction, I will proceed to describe the same in detail, reference being made to the accompanying drawing, in which is illustrated an embodiment thereof. In this drawing,—

Fig. 3 is a sectional view of one of the rear wheels taken on the line 3—3, Fig. 1, looking in the direction of the arrow.

Fig. 4 is a sectional view of one of the front wheels taken on the line 3—3, Fig. 1.

Fig. 5 is an enlarged sectional view taken on the line 3—4, Fig. 1.

Fig. 6 is a detail view of the body member of the hub.

Fig. 7 is a detail view of one of the sections comprising the rim plate.

Fig. 8 is a detail view of one of the spoke springs.

Fig. 9 is a face view of one of the spoke springs looking in the direction of the arrow 9, Fig. 8.

Fig. 10 is a detail view of one of the members comprising the circular springs.

Fig. 11 is a face view of one of the members comprising the circular springs, looking in the direction of the arrow 11, Fig. 10.

Fig. 12 is a sectional view taken on the line 12, Fig. 5, looking in the direction of the arrow.

Figure 1:
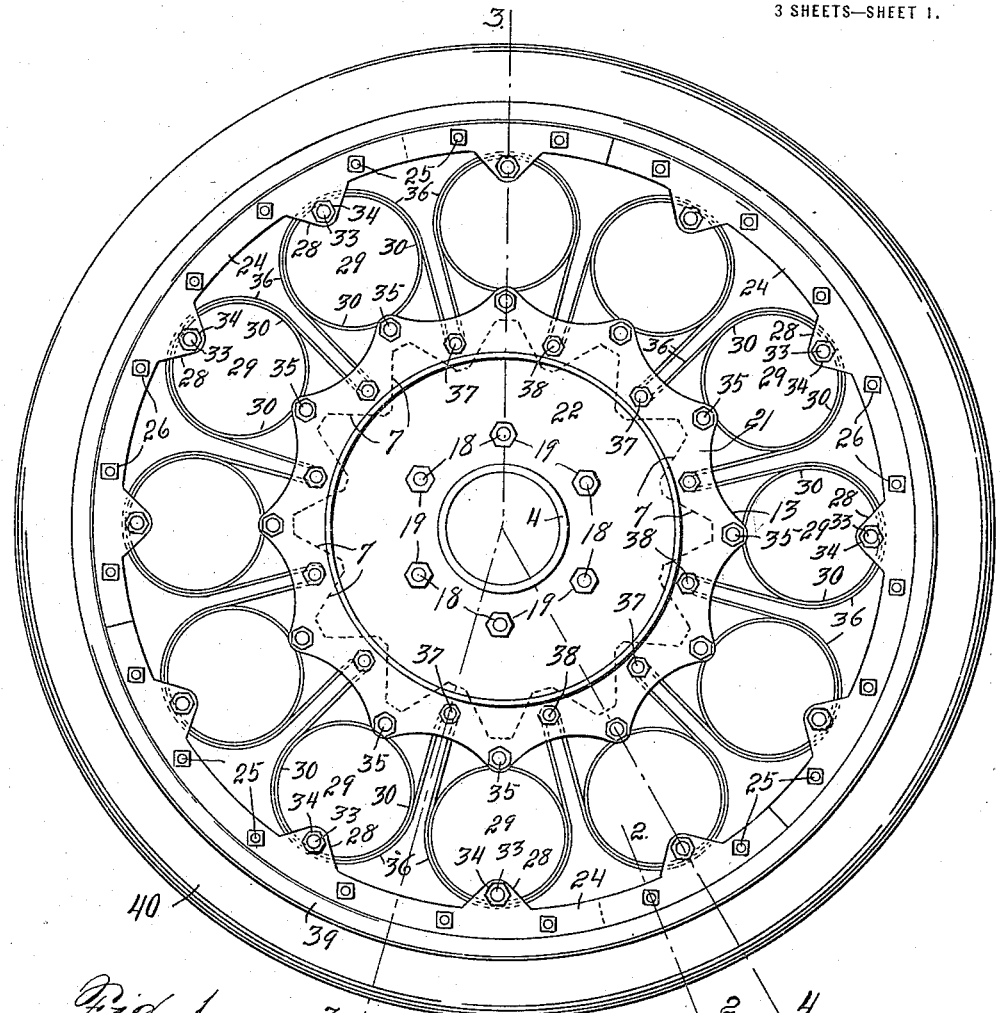
Figure 1 is a view in elevation of my improved wheel.
Figure 2:
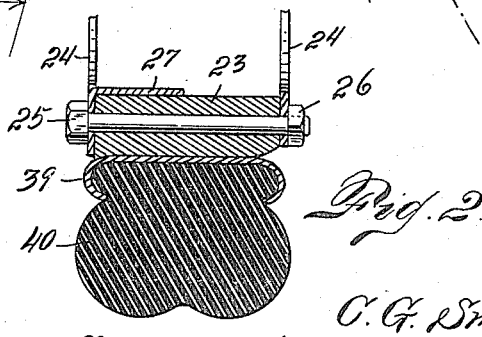
Fig. 2 is a sectional view taken upon the line 2—2, Fig. 1, looking in the direction of the arrow.

Let the numeral 5 designate the hub of the wheel, which is composed of wood and has a circular opening 6 to receive the spindle or axle with which the wheel is connected. The periphery of the hub is notched whereby projections 7 are formed thereon.

It is desirable to employ different types of hubs for the front and rear wheels, the hub of each front wheel (see Fig. 5) having its opposite sides recessed or indented as shown at 8, the walls of the recesses being tapered. Applied to the inner and outer sides of the hub, and adapted to fit the said recesses, are plates 10 and 12 which have extensions 13 projecting beyond the notched periphery of the hub, said extensions having respectively two sets of alined perforations 14 and 15. These plates have an opening which registers with the opening in the hub and through these openings a sleeve 4 is inserted, the sleeve having a collar 16 which engages the outer plate 10. A fitting 17 is mounted adjacent the inner plate 12 and has an inwardly extending portion surrounding and engaging the sleeve 4. The said plates, collar and fitting are secured to the hub by bolts 18 which pass through registering perforations formed in the said elements, and have nuts 19 applied to their free extremities.

The hub of each rear wheel has only its outer side recessed or indented, said indentation being slightly deeper than those in the hub of the front wheels, and, therefore, the plate 20 which is applied to this side will be correspondingly different in shape from the plates 10 and 12. The inner surface of each rear hub is flat and has a plate 21 of corresponding shape applied thereto, and mounted adjacent this plate is a brake drum 22 of ordinary construction. These elements are secured to the hub in the same manner as those of the front wheel hubs by means of the bolts 18 and nuts 19. In all respects other than above referred to, the construction of the hubs for the front and rear wheels are identical.

The felly of the wheel is composed of sections 23, preferably made of wood or fiber, and has plates 24 respectively applied thereto upon opposite sides. The plates 24 are each composed of three sections, the joints of the sections upon one side of the felly being arranged in staggered relation to those of the sections upon the other side, and these are secured to the said felly by means of bolts 25 which pass through registering perforations formed in the felly and plate sections. These bolts are held in place by means of nuts 26.

Certain of these plate sections upon their inner edges have laterally extending flanges 27 adapted to engage the inner periphery of the felly and help secure the latter in place. The plate sections are also provided upon their inner edges with inwardly projecting lugs 28, the lugs of the sections forming the outer plate being arranged opposite the lugs of the sections composing the inner plate. Between the hub and the rim are located circular springs 29, each composed of two semi-circular members 30. One extremity of each of said members is inwardly offset and bent to form an eye 31 while the other extremity is interiorly recessed and the portions adjacent the recess bent to form separated eyes 32, the space between the eyes 32 being slightly greater than the width of the portion forming the eye 31. The outer extremities of each pair of these semi-circular members are adapted to surround a bolt 33 passed through alined perforations formed in the oppositely disposed lugs 28 of the felly plate sections, the said bolts being secured in place by means of nuts 34. These members are so arranged that the outer extremity of one member will have an eye 31 formed therein, while the outer extremity of the other member will be provided with a pair of eyes 32 whereby the portion of one member forming the eye 31 will surround the bolt 33 intermediate the portions of the other member forming the eyes 32. The inner extremities of the members 30 similarly surround a bolt 35 passed through the alined perforations 15 formed in the extensions 13 of the respective hub plates 10 and 12 or 20 and 21, except that the eye portions are reversely arranged from those upon their opposite extremities.

Spoke springs 36 are also located between the hub and rim, the extremities of the said spoke springs being fashioned in the same manner as those of the semi-circular members 30. Two of these spoke springs respectively engage the semi-circular members 30 composing each circular spring 29 for approximately half their length, and their outer extremities are arranged to correspond with the outer extremities of the said members 30, whereby their eye portions will also surround the bolt 33 but overlapping the eye portions of the members 30.

The inner extremities of these spoke springs respectively engage bolts 37 and 38, the latter being passed through the alined perforations 14 of the hub plate extensions 13. Since the manner of connecting the extremities of the semi-circular members 30 has already been described in detail, it is not believed necessary to describe the connection between the inner extremities of the adjacent spoke springs further than to say that this joint is identical with that formed between the inner extremities of the said members 30.

Secured upon the felly 23 in any suitable manner is a rim 39 of the ordinary clencher type, upon which is mounted a solid tire 40 usually composed of rubber.

Attention is called to the fact that the bolts 33 have a shoulder formed thereon, adjacent the inner face of the inner felly plate 24, whereby no matter how tightly the nuts 34 are screwed upon the said bolts there will be no binding effect produced upon the spring extremities surrounding these bolts between the felly plates.

From the foregoing description it will be readily understood that the circular and spoke springs are hingedly connected with the hub and rim of the wheel, whereby considerable free movement is permitted the extremities of the spring members, thereby greatly increasing the resiliency of the wheel.

Having thus described my invention, what I claim is,—

1. A wheel comprising a hub and rim, circular springs located between the latter, each spring being composed of two approximately semi-circular spring members whose extremities are hingedly connected with each other and respectively hingedly connected with the hub and rim of the wheel, and spoke springs also located between said hub and rim and also having their extremities respectively hingedly connected therewith, the outer extremities of the spokes and circular springs being hinged about a common pivot.

2. A wheel comprising a hub and rim, circular springs located between the latter, each spring being composed of two approximately semi-circular spring members whose extremities are hingedly connected with each other and respectively hingedly connected with the hub and rim of the wheel, and spoke springs also located between said hub and rim, their outer extremities being hingedly connected, the said connection surrounding the hinged connection of the circular springs, and their inner and outer extremities respectively hingedly connected with the hub and rim of the wheel.

3. A wheel comprising a hub and rim, plates secured to the opposite sides of the rim, and having perforations therein, plates secured to the opposite sides of the hub and also provided with perforations, bolts passed through the perforations in the hub and rim plates, circular springs located between the hub and rim, each spring composed of two approximately semi-circular spring members, one extremity of each of said members having an eye formed therein while its opposite extremity has two separated eyes formed therein, and the inner and outer extremities of these members being adapted to respectively surround bolts carried by the rim and hub plates in such a manner that the single eye portion upon the extremity of one member surrounds the bolt intermediate the spaced eye portions of the extremity of the other member, and spoke springs also located between the hub and rim of the wheel and having their extremities terminating in eyes, the outer extremities of the spoke springs being adapted to overlap the corresponding extremities of the semi-circular spring members and surround the same bolt, while their inner extremities engage bolts carried by the hub plates.

In testimony whereof I affix my signature, in presence of two witnesses.

CICERO G. SMITH.

Witnesses:
JOHN H. CUTLER,
C. C. WOOLF.

Copies of this patent may be obtained for five cents each, by addressing the "Commissioner of Patents, Washington, D. C."